(12) United States Patent
Hölscher (10) Patent No.: US 6,769,556 B1
(45) Date of Patent: Aug. 3, 2004

(54) CANTILEVER TYPE SHELF (76) Inventor: Andreas Hölscher, Voigtelstr. 22, D-50933 Köln (DE)

( * ) Notice: Subject to any disclaimer, the term of this patent is extended or adjusted under 35 U.S.C. 154(b) by 113 days.

(21) Appl. No.: 10/070,043

(22) PCT Filed: Aug. 16, 2000

(86) PCT No.: PCT/EP00/07954

§ 371 (c)(1),
(2), (4) Date: Feb. 27, 2002

(87) PCT Pub. No.: WO01/17394

PCT Pub. Date: Mar. 15, 2001

(30) Foreign Application Priority Data

Sep. 2, 1999 (DE) ...................................... 299 15 443 U (51) Int. Cl.[7] .............................................. A47B 47/00
(52) U.S. Cl. ....................................................... 211/193
(58) Field of Search ................................ 211/193, 189, 211/192, 191

(56) References Cited

U.S. PATENT DOCUMENTS

| | | | | |
|---|---|---|---|---|
| 1,506,442 A | * | 8/1924 | O'Hara ........................ | 52/762 |
| 3,351,212 A | * | 11/1967 | McConnell .................. | 211/192 |
| 3,352,584 A | * | 11/1967 | Engel .......................... | 403/316 |
| 3,512,654 A | | 5/1970 | Olsen et al. | |
| 3,612,291 A | | 10/1971 | Skubic | |
| 4,396,125 A | | 8/1983 | Rowader | |
| 5,161,701 A | | 11/1992 | Berny | |
| 5,433,327 A | * | 7/1995 | Benvenuti et al. .......... | 211/193 |
| 6,129,224 A | * | 10/2000 | Mingers ..................... | 211/193 |

FOREIGN PATENT DOCUMENTS

| | | |
|---|---|---|
| CH | 630581 | 6/1982 |
| DE | 3918796 | 12/1990 |
| DE | 9214871 | 2/1993 |
| EP | 0061514 | 10/1982 |
| EP | 0519316 | 5/1995 |
| GB | 2044080 | 10/1980 |
| WO | 9811804 | 3/1998 |

* cited by examiner

Primary Examiner—Alvin Chin-Shue
Assistant Examiner—Sarah Purol
(74) Attorney, Agent, or Firm—Friedrich Kueffner (57) ABSTRACT

The invention releases to a cantilever type shelf for long products such as planks, tubes iron profiles and the like. Said cantilever type shelf consists of stands (1) and cantilevers (2) extending therefrom. The aim of the invention is to provide a cantilever type shelf with an extremely high carrying capacity and/or an optimum adaptability to the particular application that can be produced without problem and assembled as easy as possible. To this end, the stands (1) consist of profiled sheet metal flanges (10) that are linked by a web (12) and form approximately a double T structure. Said sheet metal flanges (10) are provided with a vertical groove (11) to which the web (12) adjoins, said vertical groove (11) having lateral holding openings (15).

14 Claims, 9 Drawing Sheets

CANTILEVER TYPE SHELF

The invention relates to a cantilever type shelf for long products such as boards, pipes, iron profiles, and the like, comprising posts and cantilever arms extending therefrom.

From European patent 0 061 514 such a cantilever type shelf is known in which the posts are in the form of double-T profile posts and wherein stamped-out portions are arranged in pairs in the flanges of the posts at a spacing from one another and with identical vertical spacing above one another. At the end of each cantilever arm two hooks are provided as holding elements for a detachable suspension in the stamped-out portions of the post. The suspending and the removal of the cantilever arms can be realized only at a certain angle. For this purpose, under certain conditions, i.e., for a comparatively great length and/or minimal vertical spacing of the cantilever arms, the arms positioned thereabove and the load placed thereon must be removed beforehand with corresponding work and time expenditures.

A cantilever type shelf is known from EP 0 519 316 B1 whose cantilever arms can be inserted horizontally and whose configuration resides in that each of the hooks has a partially downwardly thickened neck whose underside forms a support surface within a partial area of the lower edge of the stamped-out portion. This configuration requires an extremely high measure of precision. In this connection, the ascending part of the wedge in the horizontal direction should have a length which is approximately half the thickness of the flange and should be smaller by a fitting tolerance of between 0.1 and 0.5 mm than the spacing of the inner side of the hook from the inner side of the flange, wherein the support surface of the neck should have a horizontal length which corresponds approximately to half the thickness of the flange, and, finally, the height of the hook should be smaller by a fitting tolerance, preferably 0.1 to 0.5 mm than the spacing between the lower edge and the upper edge of the stamped-out portion of the flange. In this embodiment, the posts are also formed as double-T profile posts.

From WO 98/11804 a cantilever type shelf is known in which the posts are also formed as double-T profile posts, wherein the hooks can be inserted partially horizontally through the stamped-out portions and wherein in the partial area for insertion of each hook a cutout is provided and configured to receive horizontally a locking element.

Generally, for heavy load shelves the posts are double-T profile posts according to DIN 1025. The posts in the form of double-T profiles (for example, IPE beams) require a great material expenditure and thus also high freight costs. Moreover, these rolled profiles are comprised of steel qualities of the quality group St 37, i.e., a relatively inexpensive mass-produced steel. When materials of higher quality are to be used, this is often prevented by the greatly increased material costs and the reduced market share. Moreover, an optimal adaptation of the load carrying capacity of a cantilever type shelf to the respective requirements is not possible because the commercial IPE beams are deliverable only in the form of a stepped assortment and thus stepped load carrying jumps so that the concrete embodiment for an application must be either over-sized or under-sized.

In order to reduce the use of material while maintaining the stability of the posts, according to U.S. Pat. No. 3,612,291 the posts of a cantilever type shelf are manufactured of U-shaped profiled sheet metal flanges. The sheet metal flanges are connected to one another similar to a truss structure by horizontal and diagonal webs such that the posts taper pointedly in the upward direction. At the connecting locations the two sheet metal flanges thus form approximately a double-T profile together with the webs connecting them. In this known shelf, the cantilever arms are laterally screwed onto the sheet metal flanges connected to one another.

Based on this prior art, it is an object of the invention to improve significantly a cantilever type shelf of the aforementioned kind and to configure it with simple means such that with a highest degree of load carrying capacity or its optimization to the respective application a problem-free manufacture as well as an assembly as simple as possible can be achieved, wherein highest requirements with regard to the tolerance precision of the elements on the posts and the cantilever arms interacting with one another can be fulfilled.

The object is solved according to the invention in that the posts are comprised of profiled sheet metal flanges which, by means of a web, form approximately a double-T profile. Forming is carried out by means of known cold-forming methods using hot-rolled or cold-rolled strip/sheet metal coils. Accordingly, i.e., by adjustability and variability of the flanges or flange profiles, stepping the load capacity of the previously employed IPE beams can be avoided so that an optimal adaptation of the load carrying capacity with regard to material selection can be realized, i.e., better, higher quality sheet metal materials can be used at favorable prices, for example, St 52 instead of St 37. An over-sizing of the cantilever type shelf, as in the case of the prior art double-T rolled profiles, is not necessary.

The use of St 52, for example, results already in approximately 30% material savings for the same load capacity of the shelf. With the continuous variation or adaptation to the required load carrying capacity, an extra 30–40% of material can be saved. Moreover, the cost-intensive prior art working steps such as sand blasting and welding can be mostly eliminated resulting in reduced labor costs.

The sheet metal profiles according to the invention can be manufactured in almost any desired profiling from hot-rolled or cold rolled strip/sheet metal coils in all steel qualities of normal or surface-treated embodiments inexpensively on machines suitable therefore.

Moreover, the sheet metal tolerances are smaller than the IPE tolerances so that the use of the cantilever type shelf system according to the invention as a tall shelf storage system with automatic loading is possible. With the configuration according to the invention, a precisely fitting and cost-beneficial manufacture, despite narrow tolerances, as well as a problem-free suspending and removal of the cantilever arms during mounting are greatly favored. Moreover, statics advantages results by optimization of the flange profiles and their thickness up to approximately 5 mm as well as by means of the possible attachment of reinforcement materials.

It is not necessary that in the flanges of the stamped-out portions are arranged in pairs at a spacing from one another and at identical vertical spacing above one another; however, this is not to be excluded but instead can be expedient in connection with further measures.

In an advantageous embodiment of the invention, it is provided that the sheet metal flanges have a vertical groove, wherein the web adjoins the vertical groove. In this way, the same profiles can be manufactured and used inexpensively for both post sides. At the same time, the vertical groove makes possible a horizontal mounting and removal of the cantilever arms when, according to the invention, the cantilever arms have a foot plate with a nose and the nose is configured to be insertable into the vertical groove and fastenable therein so that a great statics advantage results because the forces are introduced into the web.

In this connection, it is particularly expedient that the vertical groove has lateral holding openings in which the cantilever arm can be fastened in a simple way so as to be height-adjustable, preferably in a self-locking arrangement.

According to a further embodiment, flanks, recessed relative to the outer front, adjoin externally both sides of the vertical groove, and, in this way, projections, as they are known in the prior art, and thus impairment of loading and unloading actions of the shelf can be avoided.

By providing bulges on the outer sides of the profiled sheet metal flanges for the purpose of receiving reinforcement material, wherein the reinforcement material (preferably solid material or steel) is preferably welded from the post foot up to a height of approximately 1.5 m preferably welded from the post foot up to a height of approximately 1.5 m, the use of material for optimized load carrying capacity can be further minimized and, in this way, costs can be saved.

In the recessed flanks perforations can be advantageously provided in pairs at a spacing from one another and at identical vertical spacing above one another which match the two hooks (not illustrated; compare DE 3832 537 A1) provided as holding elements at the end of each cantilever arm for a detachable suspension in the perforations or so that the hooks can be inserted partially horizontally through the perforations.

In a further embodiment of the invention, an adaptor part with adaptor nose and stamped-out portions is provided by means of which the use of conventional or already employed cantilever arms with two hooks for heavy loads can be realized without damaging the sheet metal flanges or their perforations while ensuring a configuration according to statics.

Finally, it is expedient that the posts are fastened by screwing to the post legs wherein the post feet can engage at least partially the profilings of the sheet metal flanges. In this way, the post feet can be configured more simply and no longer require to be welded on site. This provides a simplified final assembly and transport as well as storage. Accordingly, the post can be delivered already in its finish-painted form and can be assembled according to customer specifications. The freight cost-intensive posts (flange and web) can also be delivered from storage in foreign countries; the cantilever arms and post feet are then supplied according to customer specifications.

Further details, features, and advantages of the invention result from the following explanation of embodiments illustrated schematically in the drawings.

It is shown in.

As is known in the art, the cantilever type shelf according to the invention has several posts 1, at least two posts 1 for each shelf. The number of posts 1 is however freely selectable. The posts 1 can be arranged at identical or different spacings. In the embodiment according to FIGS. 1 and 2, only a portion of the post/cantilever arm connection is illustrated, wherein one cantilever arm 2 is arranged on the post 1. The post 1 is comprised of profiled sheet metal flanges 10 which form approximately a double-T profile (not illustrated, see FIG. 3) by means of the web 12.

Figure 1:
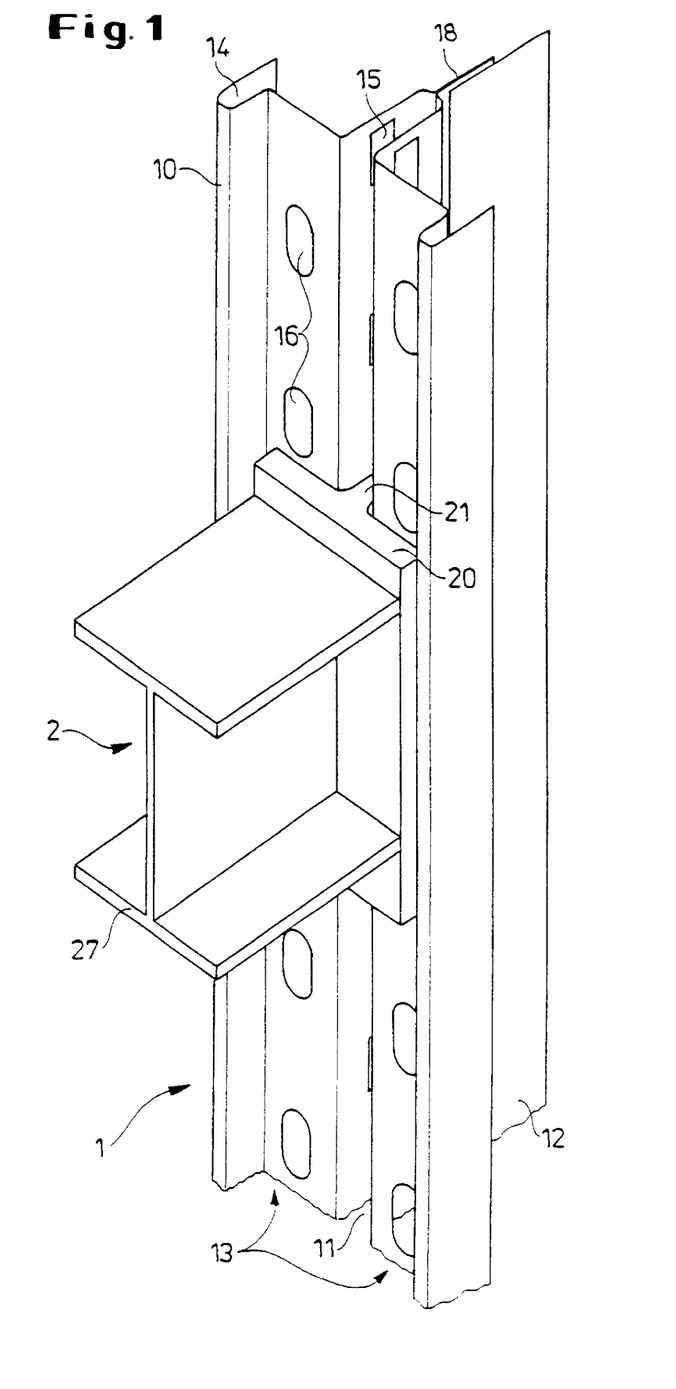
FIG. 1 a perspective partial view of a cantilever arm post with suspended cantilever arm, shown partially sectioned.

In the flanges 10 of the posts 1 perforations 16 are arranged in pairs at a spacing from one another and preferably at the same vertical spacing from one another. The sheet metal flanges 10 have a vertical groove 11 on which the web 12 is fastened externally. To both sides of the vertical groove 11 flanks 13 are provided externally and recessed relative to the outer front. Bulges 14 for receiving reinforcement material (17, FIG. 2) are provided at the outer sides of the profiled sheet metal flanges 10, wherein the reinforcement material is connected by welding up to a height of approximately 1.5 m from the post foot; in any case, not over the entire height. A web strip 18 serves as a connection between the flanges 10, or the vertical groove 11, and the web 12.

Figure 2:
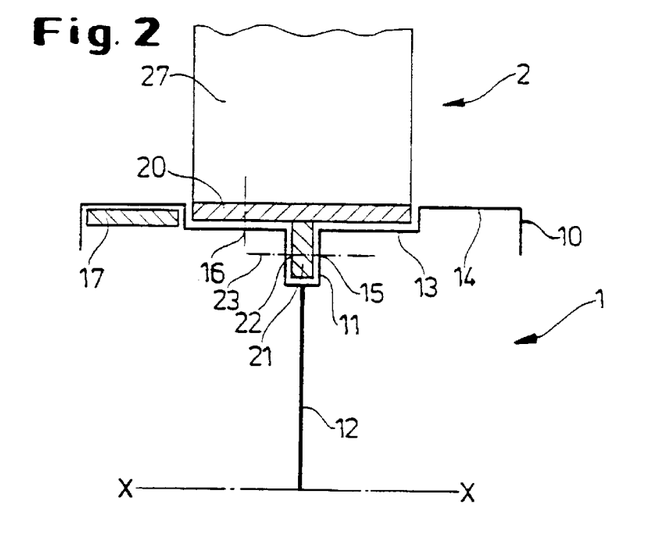
FIG. 2 a schematic cross-section as a partial section of a post of one side of the mirror axis x-x with suspended cantilever arm.

The cantilever arms 2 are comprised of a double-T profile 27 which, depending on the type of application, has a corresponding length, or another profiling and has a foot plate 20 with a nose 21, wherein the nose 21 can be introduced into the vertical groove 11 and is configured to be attached thereto.

The vertical groove 11 has lateral securing openings 15 and the nose 21 has a bore (22, FIG. 4) with a compatible penetration shape through which a holding bolt (23, FIG. 4) can be introduced, preferably so as to be self-locking.

The holding openings 15 and bores 22 (compare FIG. 4) can be provided with any suitable profiling other than that illustrated, wherein it is particularly advantageous when the support arm 2 is movable in the upward direction. Preferably, a profiling is considered as described in the international application Wo 98/11804, and the bolt 23 is then provided with a self-locking nose. Moreover, the bolt 23 can be comprised of flat material as a support rod, corresponding to the holding openings 15 or bores 22.

Figure 3:
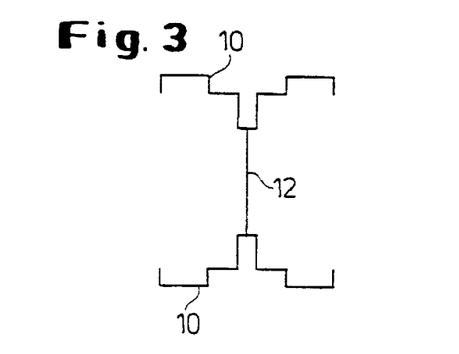
FIG. 3 a schematic complete cross-section of FIG. 2.

FIG. 3 illustrates the schematic complete cross-section of the profiled sheet metal flanges 10 with web 12.

Figure 4:
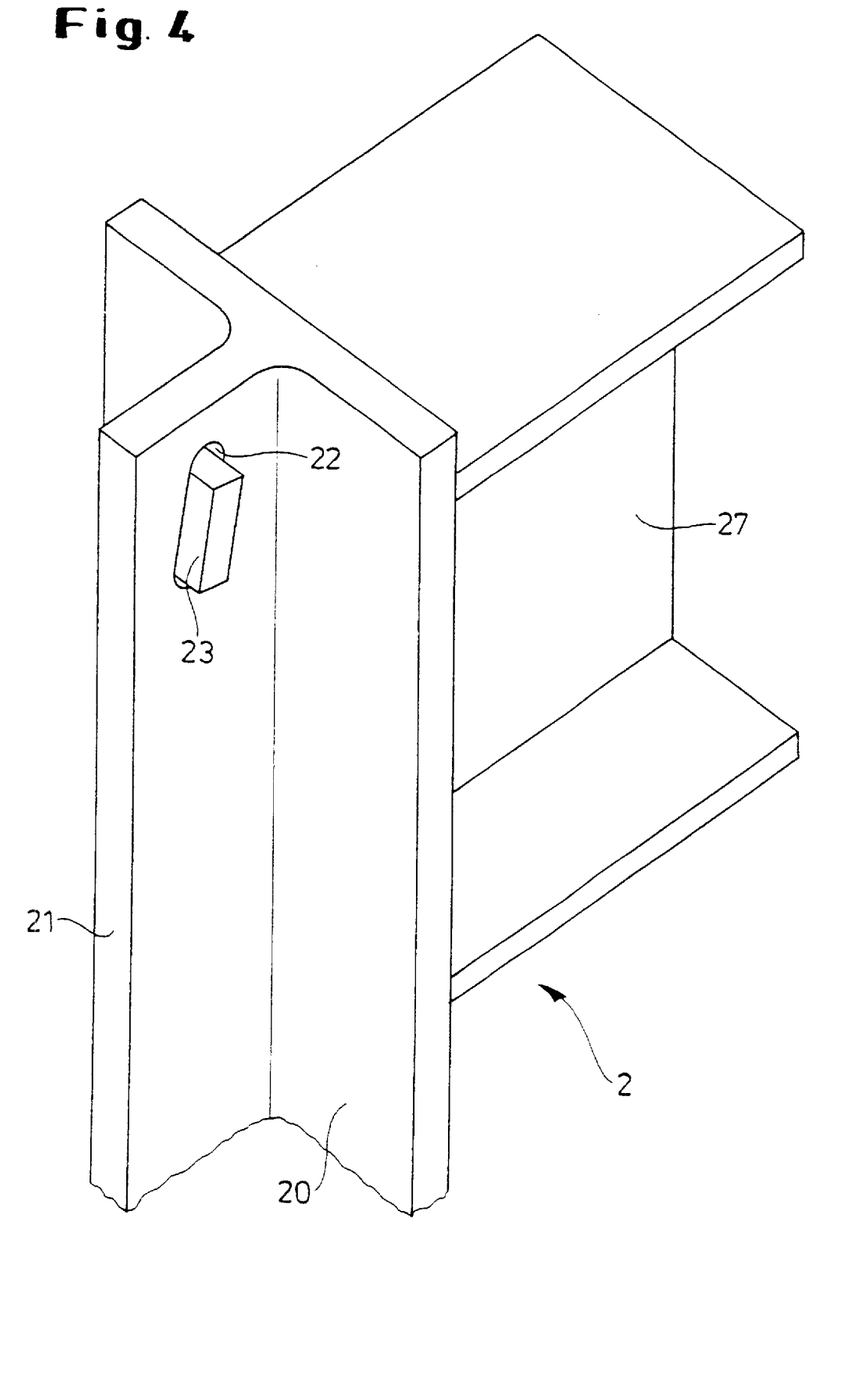
FIG. 4 a perspective partial view of a cantilever arm.

FIG. 4 illustrates in a perspective partial view the principal configuration of a cantilever arm 2 according to the invention, comprised of a double-T profile 27—wherein however also other profiles as desired can be used—and the foot plate 20 with nose 21, in which the angularly arranged bore 22 for receiving the holding bolt 23 is provided. Also shown are foot plate 20 and/or nose 21 of simplest materials or profiled steel, optionally also manufactured in an inexpensive way as a cast part or forged part.

Figure 5:
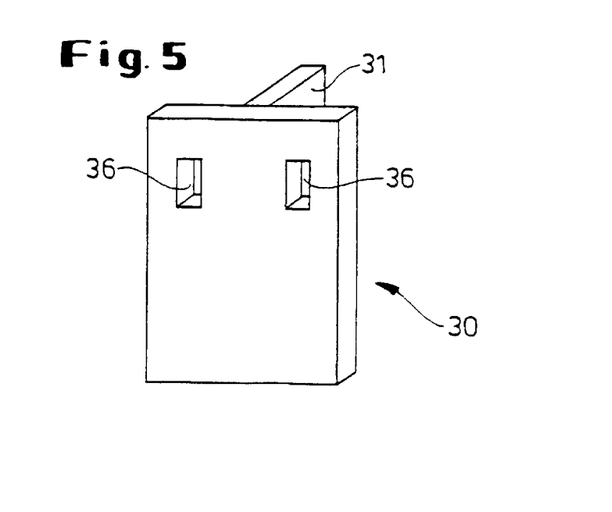
FIG. 5 an adapter part in a perspective side view.
Figure 6:
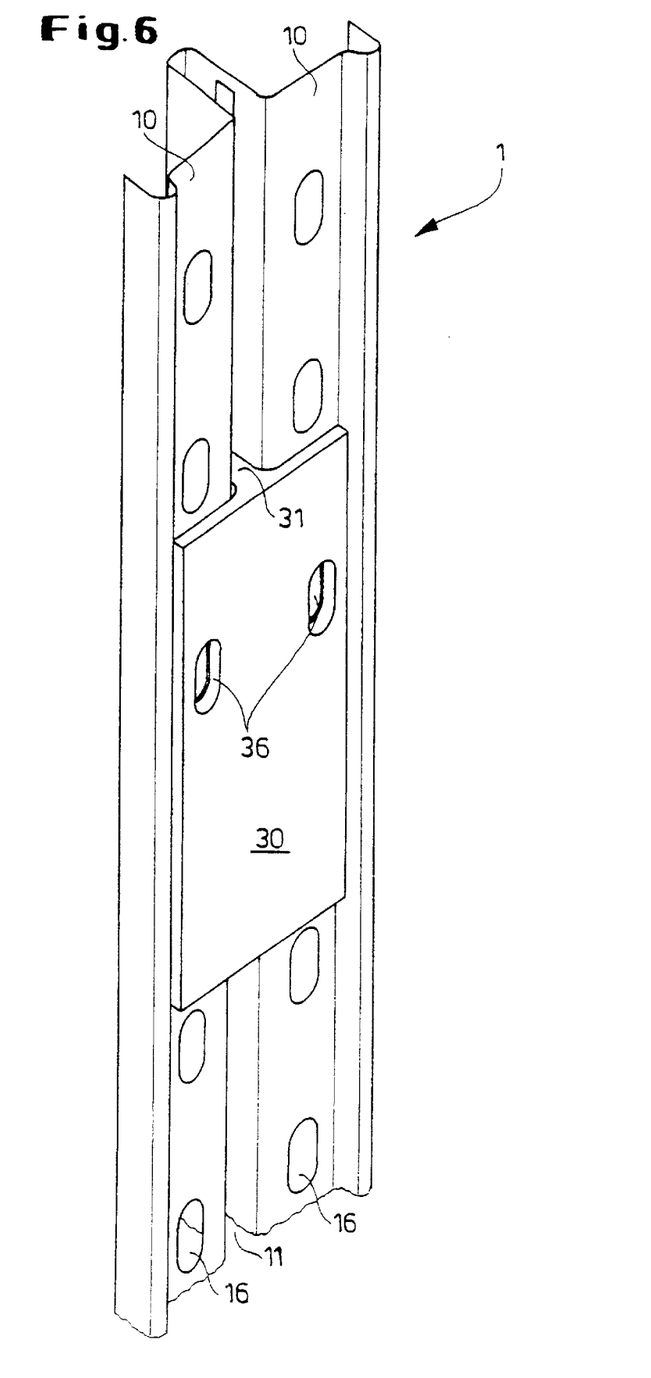
FIG. 6 an adaptor part according to FIG. 5 in the post, in a perspective side view.

FIG. 5 shows an adaptor part 30 with adaptor nose 31 and stamped-out portions 36 by which the use of conventional cantilever arms or cantilever arms already in use for heavy loads is made possible without damaging the sheet metal flanges 10 or the perforations 16, wherein FIG. 6 illustrates the attachment of the adaptor parts 30 and the engagement of the adaptor nose 31 in the vertical groove 11 on the post 1. The stamped-out portions 36 are positioned at the same level as the perforations 16.

Figure 7:
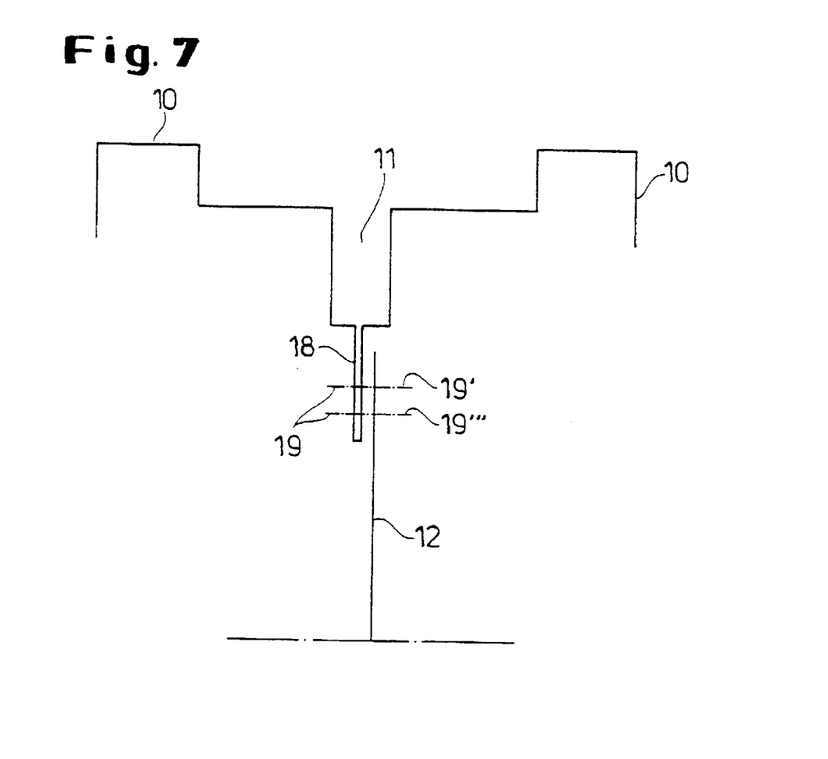
FIG. 7 a schematic partial cross-section of the web/flange connection.
Figure 8:
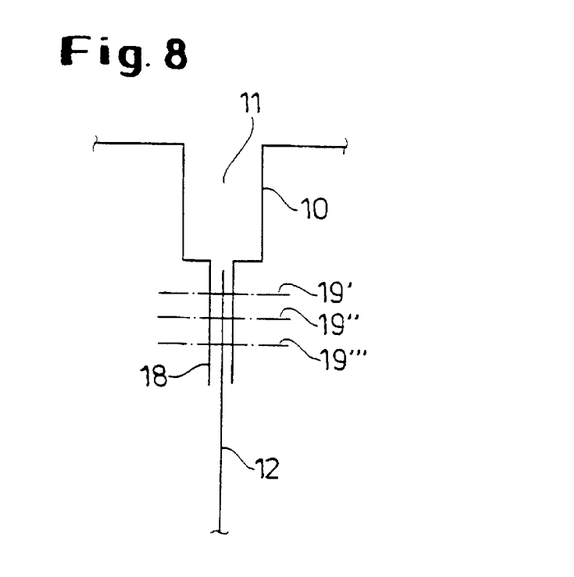
FIG. 8 a schematic partial cross-section of the web/flange connection.

FIGS. 7 and 8 show alternative configurations of the web/flange connections wherein the width of the webs 12 and/or their attachment on the sheet metal flanges 10 is adjustable, preferably by a web strip 18 in connection with one or several web connectors 19, 19', 19'', 19''', so that the web width can be changed as desired and the load carrying capacity of the shelf can be ideally adjusted to the respective requirements.

Figure 9:
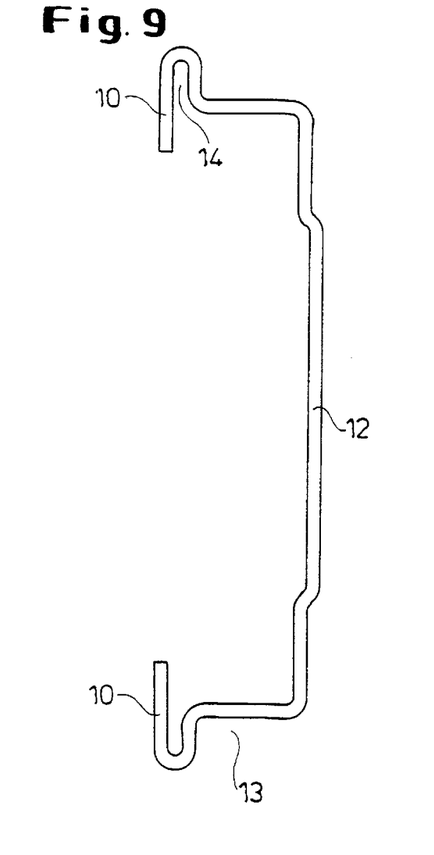
FIG. 9 the cross-section of the flange/web profile in a different embodiment.

In FIG. 9 a different embodiment of a flange/web profile 10, 12 is illustrated wherein it is shown that in this embodiment the flanges 10 and the web 12 are formed as a unitary partial profile, and for different web widths and flange profiles the corresponding desired partial profiles must be provided. The partial profile shows also the recessed flanks 13 as well as the bulges 14 and is comprised, for example, of St 52 having a thickness of 5 mm.

Figure 10:
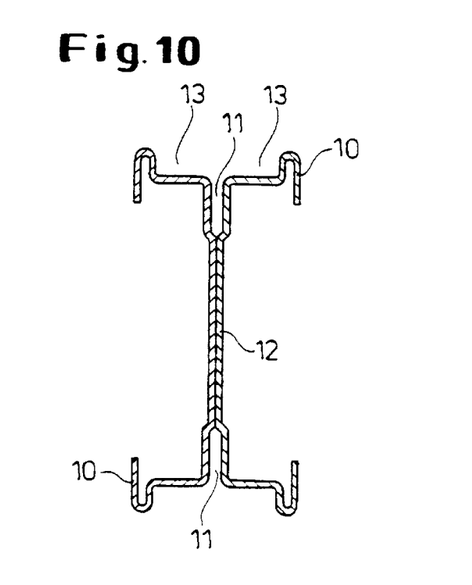
FIG. 10 a complete cross-section of two flange/web profiles according to FIG. 9.

FIG. 10 shows the complete cross-section of two mirror-symmetrically joined partial profiles wherein they are fastened to one another in the area of the web 12 in any suitable way, for example, by screws, rivets, welding seems etc. Of course, the flanks 13 are provided with the already described perforations (16, not illustrated) for attachment of the cantilever arms (2, FIG. 1).

Figure 11:
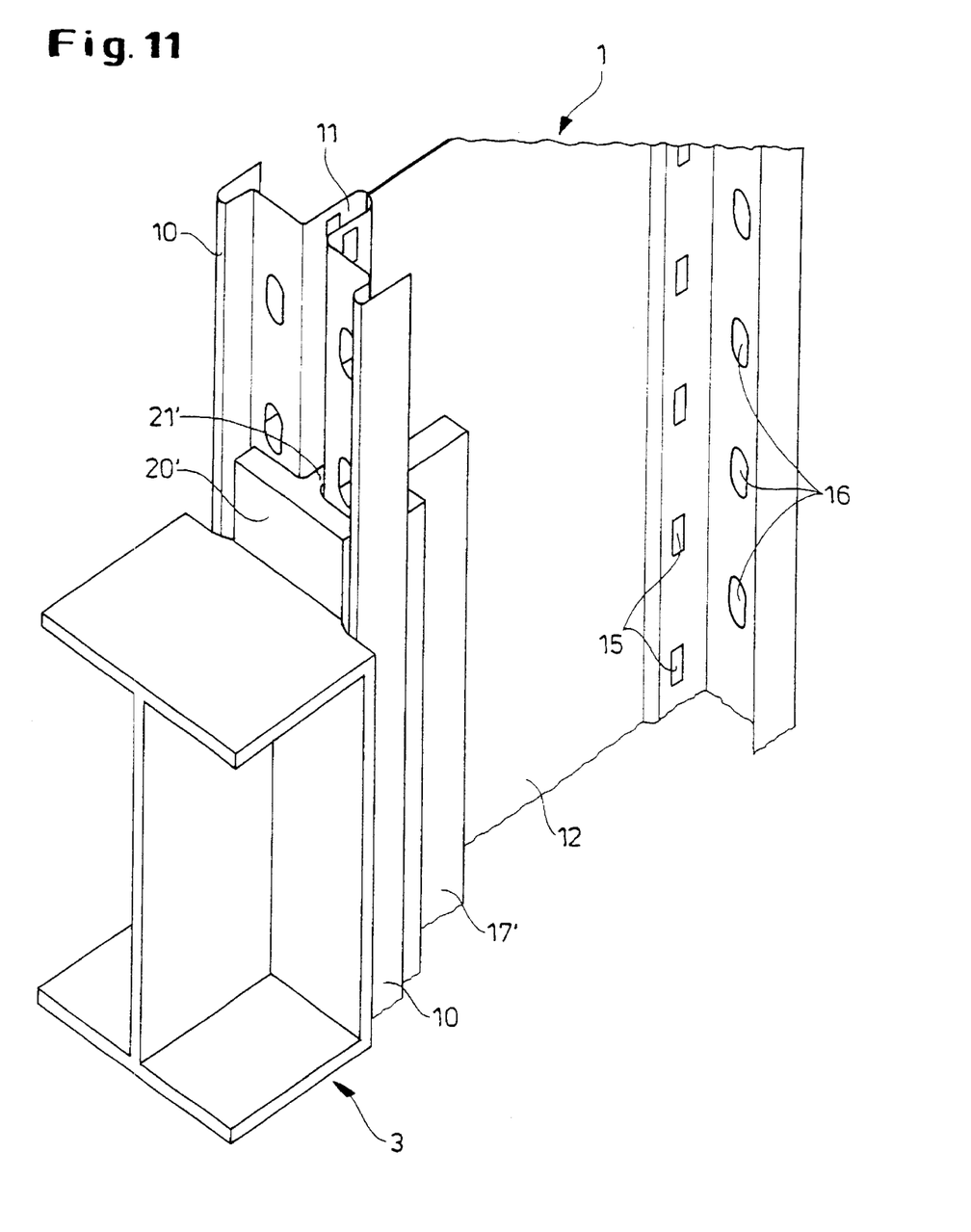
FIG. 11 a post/foot connection in a perspective partial view.
Figure 12:
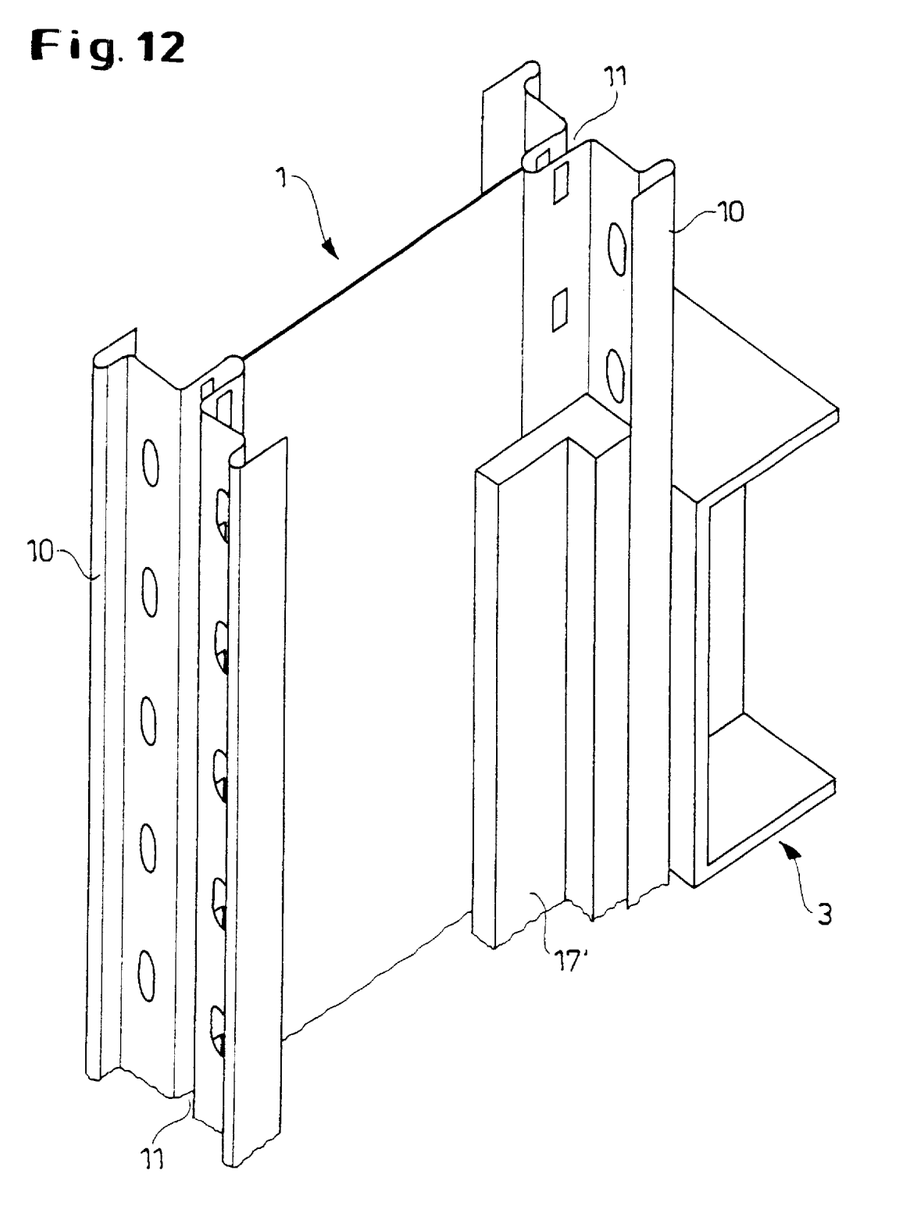
FIG. 12 as FIG. 11, but viewed at a different angle.

FIGS. 11 and 12 show the configuration of a post foot 3 (profile is illustrated greatly shortened) on the post 1. In this connection, the post foot 3, similar to the suspension of the cantilever arm according to FIG. 1, is provided with a foot plate 20' and a nose 21' wherein the nose 21' engages the vertical groove 11 and is connected in a suitable way to the profiled sheet metal flanges 10. On the backside of the sheet metal flanges 10 reinforcement material 17' can be provided and arranged for improving stability.

Figure 13:
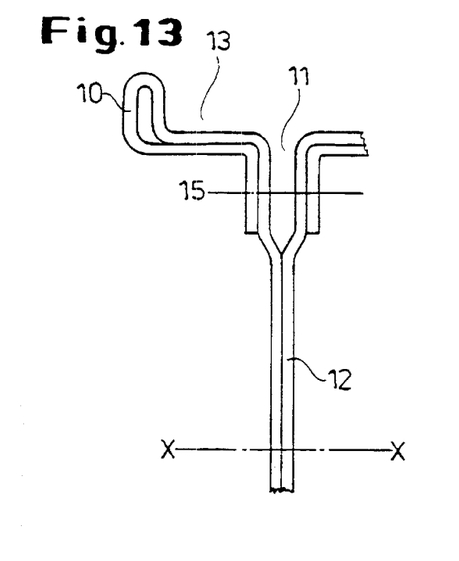
FIG. 13 a schematic partial cross-section of a flange/web profile with doubled sheet metal flanges, as a modification of Fig. 9.

FIG. 13 shows the schematic partial cross-section of a flange/web profile 10, 12 about the mirror plane x-x where the sheet metal, in the flange area or in the area of the recessed flanks 13 and the vertical groove 11, is doubled so that, in particular, the holding openings 15 in the vertical groove 11 are reinforced. As a result of the very high local forces which are introduced via the cantilever arms, the material thickness at this locations is particularly important. The reinforcement, for example, can also be realized in that several material layers form the flange or flange/web profile 10, 12 in that separate profiles are matched to one another so as to be joinable.

Figure 14:
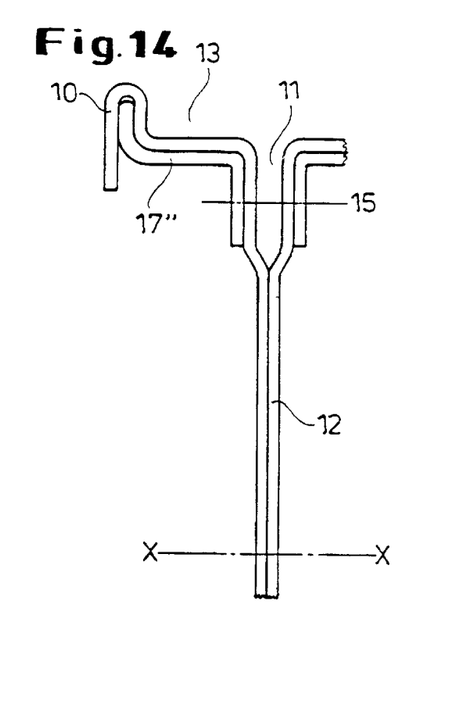
FIG. 14 a schematic partial cross-section of a flange/web profile with reinforcement material, as a supplement to FIG. 9.

FIG. 14 shows a different solution of the aforementioned object wherein in this connection reinforcement material is provided as an independent component or reinforcement part 17'' and inserted into the flanges 10. The reinforcement part 17'' has a congruent perforation shape with respect to the holding openings 15. The constructive height of the reinforcement part 17'' extends, depending on the load situation, across at least one to three holding openings 15; the precise number or length of the reinforcement part 17'' is however unlimited. Also, the reinforcement part 17'' can be used as an additional reinforcement in the case of a doubled or multi-folded flange/web profile 10, 12.

Figure 15:
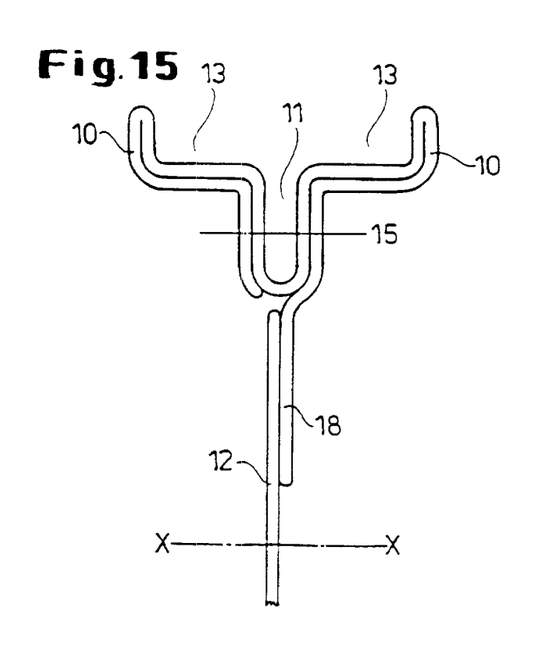
FIG. 15 a schematic cross-section of a doubled sheet metal flange with a flange/web connection.

FIG. 15 shows a further variant for reinforcing the cross-section of a flange/web profile 10, 12 about the mirror plane x-x wherein the profiled sheet metal flanges 10 are a unitary part and are doubled in the area of the recessed flanks 13 and the vertical groove 11 so that again the holding openings 15 in the vertical groove 11 are reinforced. As illustrated also in FIG. 7, the sheet metal flanges 10 have at least on one end a web strip 18 which can be connected in a suitable way to the web 12. Not illustrated but useable as an alternative is a combination in which the reinforcement part 17'' (FIG. 14) is used in addition to the doubled or multi-folded flange/web profiles (FIG. 13, FIG. 15), which thus results in an auxiliary reinforcement.

Figure 16:
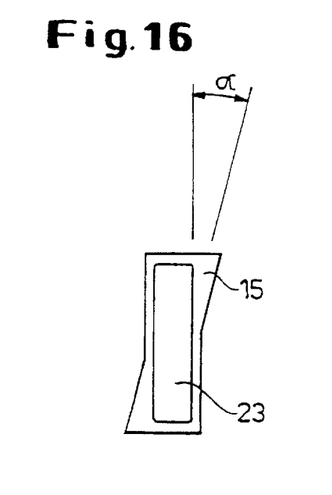
FIG. 16 a schematic hole illustration of a holding opening with bolt in the area of the vertical groove, for fastening the nose of a cantilever arm on the post.

According to FIG. 16, the bore (22, FIG. 4) in the nose (21, FIG. 4) can be configured, in correspondence with the bolt 23, also as a slotted hole while the holding openings 15 in the vertical groove (11, FIG. 1 etc.) in contrast thereto have an x-shaped widening or hole shape which makes it possible to externally lift or hold in a tiltable fashion by a certain angle Ó of approximately 15 to 20° the cantilever arm. The holding openings 15, in deviation from the illustrated embodiment, can be themselves arranged angularly within the vertical groove, matched to an angled position of the bore (compare 22, FIG. 4) for receiving the bolt 23.

The inventive features and configurations are not limited to the embodiments illustrated in the drawing figures. Possible modifications of the device according to the invention can reside in that, for example, the post profiles have very different cross-sectional shapes and that also the webs are made of different materials. The respective constructive configuration is freely selectable by a person skilled in the art for adaptation to special applications.

What is claimed is:

1. A cantilever type shelf for long products such as boards, pipes, iron profiles and the like, comprising posts (1) made of profiled sheet metal flanges (10) which, when connected to one another, form in cross-section substantially a double-T profile, and wherein cantilever arms (2) extend from the posts (1), wherein the sheet metal flanges (10) of the posts (1) have vertical grooves (11) open in a direction of the cantilever arms (2) and provided for connecting the cantilever arms (2) to the post (1), and wherein between the sheet metal flanges (10) a web (12) is provided as a connecting element whose vertical length corresponds to the length of the vertical groove (11) or the post (1), the sheet metal flanges (10) having a vertical groove (11) to which the web (12) is adjoined, recessed flanks (13) are arranged to adjoin externally the vertical groove (11) at both sides and are recessed relative to the outer front.

2. The cantilever type shelf according to claim 1, wherein the vertical groove (11) has lateral holding openings (15).

3. The cantilever type shelf according to claim 1, wherein the sheet metal flanges (10) at least in the area of the recessed flanks (13) and the vertical groove (11), are reinforced, preferably are doubled.

4. The cantilever type shelf according to claim 1, wherein bulges (14), preferably for receiving reinforcement material (17, 17', 17''), are provided on the outer sides of the profiled sheet metal flanges (10).

5. The cantilever type shelf according to claim 4, wherein the reinforcement material (17, 17') is connected by welding up to a maximum height of 1.5 m from the post foot (3).

6. The cantilever type shelf according to claim 4, wherein the reinforcement material can be introduced as a separate component or reinforcement part (17'') into the flanges (10) and is provided with a congruent perforation shape relative to the holding openings (15), wherein the constructive height of the reinforcement part (17''), depending on the load situation, extends across at least one to three holding openings (15).

7. The cantilever type shelf according to claim 2, wherein the profiled sheet metal flanges (10) are unitary parts and are doubled in the area of the recessed flanks (13) and the vertical groove (11).

8. The cantilever type shelf according to claim 1, wherein the sheet metal flanges (10) and the web (12) are formed as a unitary part-as a partial profile wherein two partial profiles are combined mirror-symmetrically and are fastened to one another.

9. The cantilever type shelf according to claim 1, wherein the cantilever arms (2) and/or the post feet (3) comprise a foot plate (20, 20') with a nose (21, 21'), wherein the nose (21, 21') can be introduced into the vertical groove (11) and is configured to be fastened therein.

10. The cantilever type shelf according to claim 9, wherein the nose (21, 21') has a bore (22) with compatible insertion shape relative to the holding openings (15), through which a holding bolt (23) can be inserted, preferably in a self-locking way, wherein the bore (22) is preferably configured, matching the bolt (23), as an angled slotted hole while the holding openings (15) have relative thereto an x-shaped widened portion or hole shape which makes it possible to externally lift or hold in a tiltable fashion by a certain angle (Ó) of approximately 15 to 20° the cantilever arm (2).

11. The cantilever type shelf according to claim 1, wherein in the recessed flanks (13) perforations (16) are arranged at a spacing from one another and preferably at identical vertical spacing above one another.

12. The cantilever type shelf according to claim 11, wherein an adaptor part (30) with adaptor nose (31) and two stamped-out portions (36) is provided which correspond to the perforations (16) in the sheet metal flanges. (10).

13. A cantilever type shelf according to claim 1, wherein the post (1) with a post foot (3) are screw-connected wherein the post foot (3) engages at least partially the profiling of the sheet metal flanges (10).

14. A cantilever type shelf according to claim 1, wherein the width of the webs (12) and/or their attachment on the sheet metal flanges (10) is adjustable, preferably by a web strip (18) in connection with one or several web connectors (19, 19', 19", 19'").

* * * * *